United States Patent [19]

Kawashima et al.

[11] Patent Number: 5,863,657

[45] Date of Patent: *Jan. 26, 1999

[54] ADHESIVE FOR BONDING TOGETHER VINYLIDENE FLUORIDE RESIN AND SUBSTRATE

[75] Inventors: Chikashi Kawashima, Scarsdale, N.Y.; Katunori Kawamura, Kawagoe, Japan

[73] Assignee: Central Glass Company, Limited, Yamaguchi, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 578,919

[22] Filed: Dec. 27, 1995

[51] Int. Cl.$^6$ .............................. B32B 7/12; B32B 27/08; C08F 259/08; C08L 51/00

[52] U.S. Cl. ..................... 428/421; 428/355 EN; 428/422; 524/196; 524/197; 524/233; 525/72; 525/263; 525/276; 526/244; 526/249; 526/250; 526/253; 526/254; 526/255

[58] Field of Search ..................... 428/421, 422; 525/199, 200, 276, 70, 72, 79, 263; 526/242, 247, 250, 255, 253, 244, 249, 254; 524/196, 197, 233

[56] References Cited

U.S. PATENT DOCUMENTS

| | | | |
|---|---|---|---|
| 4,317,861 | 3/1982 | Kidoh et al. | 428/421 |
| 4,472,557 | 9/1984 | Kawashima et al. | 525/276 |
| 4,549,921 | 10/1985 | Wolfe, Jr. | 156/272.6 |
| 4,612,351 | 9/1986 | Caporiccio et al. | 525/199 |
| 4,617,350 | 10/1986 | Maeda et al. | 525/153 |
| 4,861,835 | 8/1989 | Maeda et al. | 525/200 |
| 5,229,461 | 7/1993 | Saitoh et al. | 525/200 |

FOREIGN PATENT DOCUMENTS

| | | |
|---|---|---|
| 0 144 147 | 6/1985 | European Pat. Off. . |
| 64-22547 | 1/1989 | Japan . |

*Primary Examiner*—Vivian Chen
*Attorney, Agent, or Firm*—Evenson, McKeown, Edwards & Lenahan, PLLC

[57] ABSTRACT

An adhesive for bonding together a first substrate made of vinylidene fluoride resin and a second substrate comprises an elastic fluorohydrocarbon resin, a polyisocyanate, and an organic solvent. This elastic fluorohydrocarbon resin is obtained by graft copolymerization of a fluorine-containing copolymer with a vinylidene fluoride monomer. This copolymer is prepared by copolymerizing at least one first fluorine-containing monomer with at least one unsaturated monomer that has peroxy bond. The adhesive itself is superior in durability, and bond strength between the first and second substrates is also superior.

17 Claims, No Drawings

# ADHESIVE FOR BONDING TOGETHER VINYLIDENE FLUORIDE RESIN AND SUBSTRATE

BACKGROUND OF THE INVENTION

The present invention relates to an adhesive for bonding together a first substrate made of a vinylidene fluoride resin and a second substrate and thus for preparing a laminate which is in the form of, for example, film, sheet or composite cloth.

Vinylidene fluoride (VDF) resin, which is a general term referring to polyvinylidene fluoride (PVDF) or to VDF copolymer, is widely known as being resistant against corrosive chemicals and ultraviolet rays and as being superior in mechanical characteristics. Of fluororesins, VDF resin is particularly superior in extrudability and meltability for use as a powder coating or the like. Therefore, VDF resin is widely used as an anticorrosion coating for metal and as an electric wire coating. Furthermore, VDF has a superior characteristic as a barrier against gases, as compared with other fluororesins.

VDF resin film is widely used as a coating on a substrate, for providing the substrate with chemical resistance, stain resistance and the like. For example, there is provided a commercial VDF-resin product for an awning of truck and the like. In this product, a PVDF film having a thickness of about 5 μm is stuck to a soft polyvinyl chloride sheet by an acrylic adhesive.

U.S. Pat. No. 4,472,557 discloses an elastic fluorohydrocarbon resin obtained by graft copolymerization of a fluorine-containing elastomeric polymer with a fluorine-containing crystalline polymer (e.g., PVDF). Japanese Patent Unexamined Publication JP-A-64-22547 discloses an elastic fluorohydrocarbon resin film stuck to a substrate by a polyurethane resin layer (adhesive). This elastic fluorohydrocarbon resin film is obtained by graft copolymerization of a fluorine-containing elastomeric polymer with PVDF.

However, conventional adhesives for bonding together VDF resin and another material are inferior to the VDF resin itself in weathering resistance, water resistance, heat resistance, and the like. Therefore, these adhesives may be deteriorated under a condition of outdoor use for a long period of time or under a condition of severe temperature and severe humidity. With this, for example, the VDF resin may peel off the adhesive.

SUMMARY OF THE INVENTION

It is therefore an object of the present invention to provide an adhesive for bonding together a first substrate made of a VDF resin and a second substrate, which adhesive is superior in bond strength and durability such as weathering resistance, water resistance, heat resistance or the like.

According to the present invention, there is provided an adhesive for bonding together a first substrate made of a vinylidene fluoride resin and a second substrate. This adhesive comprises an elastic fluorohydrocarbon resin, a polyisocyanate, and an organic solvent.

In fact, an adhesive according to the present invention is superior in durability and very effective for bonding together a first substrate made of a vinylidene fluoride resin and a second substrate having thereon active hydrogen. Therefore, a laminate having a superior bond strength is formed by using the adhesive.

In general, the laminate is prepared by a method comprising the sequential steps of: (a) coating the second substrate with the adhesive to form thereon an adhesive film; (b) vaporizing the organic solvent to dry the adhesive film; and (c) sticking the first substrate to the adhesive film by adding heat. After completing the step (b), the surface of the adhesive film turns into a non-sticky condition. Therefore, after the completion of the step (b), if necessary, the coated second substrate can be stored in the shape of roll. This is very effective for continuously producing the laminate in an industrial scale.

DESCRIPTION OF THE PREFERRED EMBODIMENTS

In the following, an adhesive according to the present invention for bonding together a first substrate made of a vinylidene fluoride (VDF) resin and a second substrate will be described. By using this adhesive, the first substrate is stuck to the second substrate to improve the surface characteristics of the second substrate and to prepare a laminate. In this laminate, the first substrate as a protective layer is formed on the second substrate with an interposal of the adhesive therebetween. The adhesive comprises an elastic fluorohydrocarbon resin, a polyisocyanate, and an organic solvent.

In the invention, the VDF resin of the first substrate comprises at least one of a polyvinylidene fluoride (PVDF) and a copolymer of VDF and at least one other monomer. It is preferable that this VDF resin has a molar ratio of a VDF structural unit to at least one other structural unit caused by the at least one other monomer of from 50:50 to 100:0. If this molar ratio is less than 50:50, the VDF resin may have a rubber-like elasticity too much. With this, the first substrate may not be suitable for improving the surface characteristics of the second substrate. The at least one other monomer is not limited to a particular monomer. Examples of the at least one other monomer are tetrafluoroethylene, hexafluoropropylene, chlorotrifluoroethylene, and hexafluoro acetone. In the invention, the VDF resin may comprise a block or graft polymer of PVDF, VDF and at least one other monomer, a block or graft polymer of at least two different vinylidene fluorides and at least one other monomer, and a resin blend of these polymers.

In the invention, it is preferable that the above-mentioned elastic fluorohydrocarbon resin of the adhesive is obtained by graft copolymerization of a fluorine-containing copolymer with a VDF monomer. This copolymer has a glass transition temperature below room temperature. Thus, the fluorine-containing copolymer's segment in the resin provides the adhesive with a necessary softness, a sufficient solubility for dissolution in the organic solvent, and a sufficient bond strength to be stuck to the second substrate. On the other hand, the PVDF segment which is formed in the resin by the graft copolymerization provides the adhesive with a sufficient heat fusibility with the VDF resin of the first substrate.

It is preferable that the elastic fluorohydrocarbon resin is prepared by a method comprising the steps of:
  (a) copolymerizing at least one first fluorine-containing monomer with at least one second monomer having (i) at least one double bond and (ii) at least one peroxy bond, thereby to produce the fluorine-containing copolymer having a peroxy bond capable of decomposition during graft copolymerization;
  (b) providing a dispersion of said fluorine-containing copolymer in a liquid medium;
  (c) introducing into said dispersion a third vinylidene-fluoride monomer; and (d) polymerizing said third monomer in said dispersion so as to cause decomposition of said peroxy bond, thereby causing at least a portion of said third monomer to undergo graft copolymerization with said copolymer.

Examples of the at least one second monomer having (i) at least one double bond and (ii) at least one peroxy bond are unsaturated peroxy esters such as t-butyl peroxymethacrylate and t-butyl peroxycrotonate, and unsaturated peroxycarbonates such as t-butyl peroxyallylcarbonate and p-menthane peroxyallylcarbonate.

The fluorine-containing copolymer is not particularly limited in composition. Examples of this copolymer are copolymers of VDF and hexafluoropropylene (HFP), ternary copolymers of VDF, HFP and tetrafluoroethylene (TFE), and copolymers of VDF and chlorotrifluoroethylene (CTFE).

It is preferable that the ratio of the fluorine-containing copolymer to PVDF which is used in the gr aft copolymerization is within a range from 30:70 to 95:5 by weight. If the amount of this PVDF is less than 5 parts by weight, the adhesive may become insufficient in bond strength with the VDF resin, after the VDF resin is stuck to the adhesive by adding heat. If the amount of the fluorine-containing copolymer is less than 30 parts by weight, the adhesive may become insufficient in softness and in solubility for dissolution in the organic solvent.

In the invention, the polyisocyanate is not particularly limited, and thus it can be selected from various polyisocyanates. It is considered that the mixing of the polyisocyanate with the elastic fluorohydrocarbon resin serves to increase the bond strength between the adhesive and the second substrate, and that the polyisocyanate reacts mainly with terminal groups of the elastic fluorohydrocarbon resin, thereby to improve the adhesive in creep resistance, heat resistance and the like.

The mixing ratio of the polyisocyanate to the elastic fluorohydrocarbon resin is preferably within a range from 0.3:100 to 50:100 by weight and more preferably within a range from 0.5:100 to 30:100 by weight. If the amount of the polyisocyanate is less than 0.3 parts by weight, the effect of the polyisocyanate addition may be insufficient. If the amount of the polyisocyanate is greater than 50 parts by weight, the adhesive may become insufficient in softness, chemical resistance and weathering resistance.

Examples of the polyisocyanate are ethylene diisocyanate, tetramethylene diisocyanate, hexamethylene diisocyanate (HDI), dodecamethylene diisocyanate, 1,6,11-undecane triisocyanate, 2,2,4-trimethylhexane diisocyanate, 2,6-diisocyanate methylcaproate (LDI), bis(2-isocyanate ethyl) fumarate, bis(2-isocyanate ethyl) carbonate, 2-isocyanate ethyl-2,6-diisocyanate hexanoate, isophorone diisocyanate (IPDI), 4,4'-diphenylmethane diisocyanate (MDI), dicyclohexylmethane diisocyanate (hydrogenated MDI or HMDI), cyclohexylene diisocyanate, methylcyclohexylene diisocyanate (hydrogenated TDI), bis(2-isocyanate ethyl)-4-cyclohexene-1,2-dicarboxylate, xylylene diisocyanate (XDI), diethylbenzene diisocyanate, tolylene diisocyanate (TDI). Further examples of the polyisocyanate are urethane adducts, biuret compounds, isocyanurates, blocked isocyanates and urethane prepolymers, which are prepared by using the above-mentioned examples of the polyisocyanate, such as water-modified HDI, TDI dimer, TDI-trimethylol-propane (TMP) adduct (L), HMDI-biuret compound, blocked L-phenol compound, IPDI trimer, and mixtures of at least two of these examples .

With respect to the selection of the polyisocyanate, when the discoloration of the adhesive is unfavorable, polyisocyanates of which isocyanate group is not positioned adjacent to the benzene nucleus are preferably used. Examples of these polyisocyanates are aliphatic diisocyanates such as HDI, XDI and LDI, alicyclic isocyanates such as IPDI, hydrogenated MDI and hydrogenated XDI. Furthermore, urethane adducts, biuret compounds, isocyanurates, blocked isocyanates and urethane prepolymers, which are prepared by using these examples of the polyisocyanate, can be also preferably used.

In the invention, the second substrate having active hydrogen (HX) on the surface thereof, which is capable of reacting with isocyanate group is preferably used, because a particular pretreatment on the second substrate's surface is not necessary. Examples of functional groups containing the active hydrogen are —OH, —COOH, —NH$_2$, —CONH and ester groups. As polymers containing these functional groups, for example, poly(meta) acrylic acid (ester), polyurethane and polyamide can be cited. In the invention, the second substrate may be, for example, a substrate made of a resin which has active-hydrogens as a pendant functional group, a substrate made of a blended resin between a resin having active-hydrogens and another resin not having it, or a substrate coated with an active-hydrogen containing material.

If the second substrate is made of metal, glass or the like, the second substrate is coated with a primer such as silane coupling agent. The silane coupling agent which can be used in the invention is a silane represented by $R^1$—Si$(OR^2)_3$, where $R^1$ is an organic functional group such as vinyl group or amino group, and $OR^2$ is a hydrolyzable group such as halide group, acyloxy group or alkoxyl group. Examples of such silane are chloroalkyl group containing silanes such as γ-chloropropylmethyldichlorosilane, γ-chloropropylmethyldimethoxysilane, γ-chloropropylmethyldiethoxysilane, γ-chloropropyltrimethoxysilane and γ-chloropropyltriethoxysilane; unsaturated group containing silanes such as vinyltrichlorosilane, vinyltriethoxysilane, vinyltris (methoxyethoxy)silane and γ-methacryloxypropyltrimethoxysilane; γ-glycidoxy- and epoxy-containing silanes such as γ-glycidoxypropyltrimethoxysilane, γ-glycidoxypropyltriethoxysilane, γ-glycidoxypropylmethyldiethoxysilane, γ-glycidoxypropylmethoxysilane and γ-glycidoxypropylsilane triol; mercapto-containing silanes such as γ-mercaptopropyltrimethoxysilane; and amino-containing silanes such as γ-aminopropyltrimethoxysilane, γ-aminopropyltriethoxysilane, γ-aminopropylmethyldiethoxysilane and N-(2-aminoethyl)-3-aminopropyltrimethoxysilane. Of these examples, the amino-containing silanes are the most preferable examples.

In case that a resin (e.g., polyethylene or polytetrafluoroethylene) to which an adhesive according to the present invention is hardly stuck is used for the second substrate, a certain treatment (e.g., flame treatment, corona discharge treatment, or sodium etching treatment) should be conducted. With this, a functional group(s) having active hydrogen is formed on the surface of this resin. Therefore, a strong bonding between the adhesive and the resin can be achieved. Thus, the second substrate is not limited in material as long as the second substrate is made of a material which can be formed into a fibrous or platelike shape. Therefore, the material for the second substrate can be selected from various materials, according to the requisite characteristics therefor in mechanical strength, heat resistance, weathering resistance, transparency and the like.

The first and second substrates are not particularly limited in shape. It is preferable that these substrates are platelike in shape. In particular, it is preferable that at least one of these substrates is platelike, sheet or film-like in shape. These substrates may or may not have hole(s) and/or pattern(s), and may or may not be formed into a woven fabric or nonwoven fabric.

The organic solvent of the adhesive can be selected from various organic solvents. In view of solubility of the elastic fluorohydrocarbon resin, it is preferable to select the organic solvent from high-polarity organic solvents such as N,N-dimethylformamide (DMF), N,N-dimethylacetoamide and N-methylpyrrolidone, and ketones and esters such as acetone, methyl ethyl ketone, methyl isobutyl ketone, ethyl acetate and tetrahydrofuran. As the organic solvent of the present invention, it is possible to use at least one solvent selected from the group consisting of high-polarity solvents and other solvents (e.g., ketones and esters). For example, as the organic solvent, it is possible to use a solvent mixture of at least one high-polarity solvent and at least one other solvent.

The mixing ratio of the organic solvent to the total of the elastic fluorohydrocarbon and the polyisocyanate is decided according to the requisite viscosity of the adhesive to prepare an aimed adhesion. In general, the amount of the organic solvent is adjusted such that the concentration of the total of the elastic fluorohydrocarbon and the polyisocyanate is from 1 to 60 wt % based on the total weight of the adhesive solution.

In general, the laminate is prepared by a method comprising the sequential steps of: (a) coating the second substrate with the adhesive to form thereon an adhesive film; (b) vaporizing the organic solvent to dry the adhesive film; and (c) sticking the first substrate to the adhesive film by adding heat. The coating method may be selected from usual methods such as dip coating, coating with brush, spray coating, roller coating, flow coating and curtain flow coating. The vaporization of the organic solvent may be conducted using heat or without using heat. The above-mentioned step (c) is conducted by adding heat under a certain pressure (preferably from about 5 to 100 kgf/cm$^2$ to get the flat surface) or without adding any pressure. The heating temperature during the step (c) is limited to a certain range by the degree of heat resistance of the second substrate. In case that the second substrate is made of a heat resistant material such as glass or glass fiber, it is preferable that the step (c) is conducted at a temperature not higher than 280° C. for maintaining the proper function of the adhesive. If this temperature is not higher than 180° C., the VDF resin may not be melted in the step (c). With this, the VDF resin may not be stuck to the adhesive film. The step (c) may be discontinuously conducted for preparing each piece of laminate or continuously conducted for preparing a roll of laminate.

The following examples are illustrative of the present invention, but these examples are not limitative.

EXAMPLE 1

In this example, an adhesive according to the present invention was prepared; then the first and second substrates were bonded together by the adhesive to prepare a laminate; and then evaluation tests were conducted on the laminate, as follows.

(A) PREPARATION OF ELASTIC FLUOROHYDROCARBON RESIN

At the first step, 50 kg of purified water, 100 g of potassium persulfate, 150 g of ammonium perfluorooctanoate and 100 g of t-butyl peroxyallylcarbonate were introduced into a 100-liter stainless steel autoclave, and, after exhausting the gas atmosphere of the autoclave, 12.5 kg of VDF monomer and 7.55 kg of chlorotrifluoroethylene (CTFE) monomer were additionally charged into the autoclave. The resultant mixture was subjected to polymerization reaction at 50° C. for 20 hr with continuous stirring. The product of the reaction had an appearance of white latex, and by a salting-out treatment it turned into a rubber-like powder. The powder was washed with water, dried in vacuum, then washed with n-hexane to completely remove unreacted residue of t-butyl peroxyallylcarbonate and again dried in vacuum. Obtained as the result was 16 kg of a copolymer (i.e. the fluorine-containing copolymer) in the form of white powder.

A characteristic curve obtained by thermal analysis of the copolymer by using a scanning differential calorimeter (DSC) exhibited an exothermic peak at 160°–180° C. The peak was judged to be attributed to the decomposition of peroxy bond. By DSC analysis at low temperatures, the glass transition temperature of the copolymer was determined to be –26.5° C. By iodimetric titration, the content of active oxygen in the copolymer was measured to be 0.042%. By elemental analysis of the copolymer, the molar ratio of the VDF structural unit to the CTFE structural unit was determined to be 80:20.

At the second step, 12 kg of the thus obtained copolymer and 75 kg of R-113 (1,1,2-trichlorotrifluoroethane) were introduced into a 100-liter stainless steel autoclave. After exhausting the gas atmosphere of the autoclave, 6 kg of VDF monomer was additionally charged into the autoclave, and the resultant mixture was subjected to graft copolymerization reaction at 95° C. for 24 hr.

A copolymer formed by this reaction was separated from the solvent and dried to obtain 16.6 kg of white powder (i.e. the elastic fluorohydrocarbon resin). By the calculation from the yield, it was found that 38.3 parts by weight of VDF monomer underwent graft copolymerization with 100 parts by weight of the copolymer obtained by the first step.

(B) PREPARATION OF ADHESIVE 100 g of the above-prepared elastic fluorohydrocarbon resin and 400 g of N,N-dimethylformamide were introduced into a 1-liter glass beaker. Then, the mixture was stirred for 1 hr to dissolve the resin, using T. K. HOMODISPER (trade name) which is a high-speed stirrer made by Tokushu Kika Kogyo Co. at a speed of 2,000 r.p.m. To this solution, 70 g of methyl ethyl ketone and 11.4 g of CORONATE HX (trade name) which is a polyisocyanate made by Nippon Polyurethane Industry Co. were additionally added for preparing an adhesive, while stirring was conducted. This polyisocyanate, CORONATE HX, is a non-yellowing type polyisocyanate containing HDI as a raw material and an isocyanurate ring.

(C) PREPARATION OF LAMINATE

At first, one major surface of a taffeta cloth which has widths of 30 cm and a thickness of 0.3 mm and is made of nylon-6 fibers having a thickness of 720 deniers was coated with the above-prepared adhesive by a bar coater. Then, the coated cloth was dried in an oven at 130° C. for 2 min. The amount of the dried adhesive formed on the taffeta cloth was about 15 g per 1 m$^2$ of the cloth.

Separately, HYLAR461 which is a polyvinylidene fluoride made of AUSIMONT Co. and the above-prepared elastic fluorohydrocarbon resin were mixed together in a ratio of 1:2 by weight. This mixture was kneaded by two rolls which were kept heated at 180° C., and then press-shaped at a constant rate into a 0.1 mm thick film (i.e., VDF resin film).

Then, the VDF resin film was placed on the coated cloth to prepare a laminate in a manner to interpose the adhesive therebetween. Then, this laminate was interposed between 1 mm thick stainless steel plates and then maintained under a pressure of 10 kgf/cm² in a compression molding machine heated at 200° C. Then, the laminate was taken from the machine and then allowed to cool down.

(D) EVALUATION TESTS

The tensile peeling test was conducted on the laminate in accordance with Japanese Industrial Standard (JIS) K 6328 using a rubber-coated cloth. In this test, peeling occurred at the boundary between the taffeta cloth (second substrate) and the adhesive and also in the inside of the adhesive (i.e., cohesive failure). The result is shown in Table 1.

The accelerated weathering test was conducted by putting the laminate for seven days in a thermo- and humidi-stat maintained at 85° C. and 95 % humidity. After this weathering test, the above-mentioned tensile peeling- test was conducted. In this peeling test, peeling occurred at the boundary between the taffeta cloth and the adhesive and also in the inside of the adhesive. The result is shown in Table 1.

COMPARATIVE EXAMPLE 1

In this comparative example, Example 1 was slightly modified as follows. At first, the VDF resin film (the first substrate) of Example 1 was coated with a commercial polyurethane adhesive by a bar coater. This adhesive has a trade name of CRISBON which is made by Dai Nippon Ink Co. and contains 100 parts by weight of CRISBON C-4365T as a main component, 8 parts by weight of CRISBON NX (trade name) as a crosslinking agent, 3 parts by weight of CRISBON ACCELERANT HM (trade name) as an accelerant, and a solvent containing DMF and toluene in a ratio of 1:40 by weight. After that, the coated VDF resin film was dried in an oven of 80° C. for 1 min to vaporize the solvent. The amount of the dried adhesive formed on the VDF resin film was about 40 g per 1 m² of the VDF resin film.

The thus prepared VDF resin film coated with the polyurethane adhesive was immdiately placed on the taffeta cloth of Example 1 to prepare a laminate. Then, this laminate was allowed to stand still at room temperature for 24 hr. The same evaluation tests as those of Example 1 were conducted, and the results are shown in Table 1. In the peeling test before and after the weathering test, peeling occurred at the boundary between the VDF resin film and the adhesive. In fact, the VDF resin film peeled off the adhesive by the weathering test.

TABLE 1

| | Peeling Strength (kgf/cm²) | |
|---|---|---|
| | Before Weathering Test | After Weathering Test |
| Example 1 | 2.5 | 2.3 |
| Com. Ex. 1 | 0.8 | <0.1 |

EXAMPLE 2

In this example, Example 1 was slightly modified as follows.

At first, a glass plate having widths of 20 cm and a thickness of 3 mm was immersed into an aqueous solution containing 5% of a silane coupling agent which is an aminosilane, that is, SH6020 (trade name) made by Toray·Dow Corning·Silicone Co. Then, the glass plate was dried at 120° C. for 2 min. Then, one major surface of this glass plate was coated with the adhesive of Example 1 by a bar coater, followed by drying in an oven at 130° C. for 2 min to vaporize the solvent. The amount of the dried adhesive formed on the glass plate was about 10 g per 1 m² of the glass plate. Then, a commercial PVDF film which has a thickness of 0.15 mm and is made by SOLVEY Co. was placed on the coated glass plate to prepare a laminate. Then, this laminate was interposed between two fluoro-rubber plates, then maintained under a pressure of 5 kgf/cm² for 2 min in press machine heated at 200° C., and then was allowed to cool down. The peeling test was conducted on the laminate in the same manner as in Example 1. The result is shown in Table 2. An accelerated weathering test was conducted on the laminate by exposing the PVDF film side of the laminate to the light in a sunshine weathermeter with a black panel temperature of 60° C. for 2,000 hr. After this weathering test, the same peeling test was conducted. The result is shown in Table 2.

COMPARATIVE EXAMPLE 2

In this comparative example, Example 2 was repeated except in that the polyisocyanate was omitted in the preparation of the adhesive.

COMPARATIVE EXAMPLE 3

In this comparative example, Example 2 was slightly modified as follows. At first, a glass plate which had been treated with a silane coupling agent in the same manner as in Example 2 was coated with an commercial acrylic adhesive, that is, NB-91 B (trade name) made by Kyodo Yakuhin Co., by a bar coater. Then, the coated glass plate was dried at 80° C. for 2 min to vaporize the solvent. The amount of the dried adhesive formed on the glass plate was about 10 g per 1 m² of the glass plate. Then, the PVDF film of Example 2 was stuck to the coated glass plate in the same manner as in Example 2 to prepare a laminate. The same evaluation tests as those of Example 2 were conducted on the laminate. The results are shown in Table 2 .

REFERENTIAL EXAMPLE

In this referential example, Example 2 was repeated expect in that the glass plate was not treated with the silane coupling agent. The results are shown in Table 2. With respect to these results, it is considered that a strong bonding between the glass plate and the adhesive was not obtained because the glass plate did not have active hydrogen thereon.

TABLE 2

| | External Appearance | | Peeling Strength (kgf/cm²) | |
|---|---|---|---|---|
| | Before Test | After Test | Before Test | After Test |
| Example 2 | Colorless and Transparent | Colorless and Transparent | 4.1 | 4.3 |
| Com. Ex. 2 | Colorless and Transparent | — | 0.8 | — |
| Com. Ex. 3 | Colorless and Transparent | Adhesive yellowed. | 2.6 | 0.3 |
| Ref. Ex. | Colorless and Transparent | — | 0.1 | — |

What is claimed is:

1. An adhesive adapted for bonding together a first substrate made of a vinylidene fluoride resin and a second substrate, said adhesive comprising:
   an elastic fluorohydrocarbon resin, wherein said elastic fluorohydrocarbon resin is prepared by a method comprising the steps of:

(a) copolymerizing at least one first fluorine-containing monomer with at least one second monomer having (i) at least one double bond and (ii) at least one peroxy bond, said at least one first fluorine-containing monomer being selected from the group consisting of a combination of vinylidene fluoride and hexafluorotpropvlene, a combination of vinylidene fluoride, hexafluoropropylene and tetrafluoroethylene, and a combination of vinylidene fluoride and chlorotrifluoroethylene, thereby to produce a fluorine-containing copolymer having a glass transition temperature below room temperature and a peroxy bond capable of decomposition during graft copolymerization;

(b) providing a dispersion of said fluorine-containing copolymer in a liquid medium;

(c) introducing into said dispersion a third monomer which is vinylidene fluoride; and (d) polymerizing said vinylidene fluoride in said dispersion so as to cause decomposition of said peroxy bond, thereby causing at least a portion of said vinylidene fluoride to undergo graft copolymerization with said copolymer;

a polyisocyanate; and an organic solvent.

2. An adhesive according to claim 1, wherein said adhesive is bonded between a first substrate made of a vinylidene fluoride resin and a second substrate, wherein said vinylidene fluoride resin comprises a member selected from the group consisting of a polyvinylidene fluoride and a copolymer vinylidene fluoride and at least one other monomer, wherein if said at least one other monomer is present, the vinylidene fluoride resin has a molar ratio of vinylidene fluoride units to at least one other structural unit derived from said at least one other monomer of from 50:50 to 100:0.

3. An adhesive according to claim 2, wherein said at least one other monomer is selected from the group consisting of tetrafluoroethylene, hexafluoropropylene, chlorotrifluoroethylene and hexafluoro acetone.

4. An adhesive according to claim 1, wherein said adhesive is bonded between a first substrate and a second substrate, and said second substrate has thereon active hydrogen.

5. An adhesive according to claim 1, wherein said organic solvent comprises N,N-dimethylformamide.

6. An adhesive according to claim 5, wherein said organic solvent is a solvent mixture of N,N-dimethylformamide and at least one other solvent selected from ketones and esters.

7. An adhesive according to claim 1, wherein said polyisocyanate is hexamethylene diisocyanate or an isocyanurate derived from said hexamethylene diisocyanate.

8. An adhesive according to claim 1, wherein said adhesive is bonded between a first substrate and a second substrate, and said second substrate is coated with a primer such that said second substrate has thereon active hydrogen.

9. An adhesive according to claim 8, wherein said primer comprises a silane coupling, agent.

10. An adhesive according to claim 1, wherein said at least one second monomer is a member selected from the group consisting of an unsaturated peroxy ester and an unsaturated peroxycarbonate.

11. An adhesive according to claim 1, wherein the ratio of said fluorine-containing copolymer to said third monomer is within a range from 30:70 to 95:5 by weight.

12. An adhesive according to claim 1, wherein the ratio of said polyisocyanate to said elastic fluorohydrocarbon resin is within a range from 0.3:100 to 50:100 by weight.

13. An adhesive according to claim 12, wherein the ratio of said polyisocyanate to said elastic fluorohydrocarbon resin is within a range from 0.5:100 to 30:100 by weight.

14. An adhesive according to claim 1, wherein said polyisocyanate is selected from the group consisting of ethylene diisocyanate, tetramethylene diisocyanate, hexamethylene diisocyanate, dodecamethylene diisocyanate, 1,6,11-undecane triisocyanate, 2,2,4-trimethylhexane diisocyanate, 2,6-diisocyanate methylcaproate, bis(2-isocyanate ethyl) fumarate, bis(2-isocyanate ethyl) carbonate, 2-isocyanate ethyl-2,6-diisocyanate hexanoate, isophorone diisocyanate, 4,4'-diphenylmethane diisocyanate, dicyclohexylmethane diisocyanate, cyclohexylene diisocyanate, methylcyclohexylene diisocyanate, bis(2-isocyanate ethyl)-4-cyclohexene-1,2-dicarboxylate, xylylene diisocyanate, diethylbenzene diisocyanate and tolylene diisocyanate.

15. An adhesive according to claim 1, wherein said organic solvent comprises a first solvent which is a solvent selected from the group consisting of N,N-dimethylacetoamide, N-methylpyrrolidone and mixtures thereof.

16. An adhesive according to claim 15, wherein said organic solvent is a solvent mixture of said first solvent and a second solvent selected from the group consisting of ketones and esters and mixtures thereof.

17. A laminate comprising:

a first substrate made of a vinylidene fluoride resin; and a second substrate which is stuck to said first substrate by an adhesive of claim 1.

* * * * *